(No Model.)

H. H. HENNEGIN.
GAS ENGINE.

No. 597,771.   Patented Jan. 25, 1898.

5 Sheets—Sheet 1.

Witnesses:
G. A. Pennington
J. R. Cornwall

Inventor:
H. H. Hennegin
by Paul Bakewell
his atty.

THE NORRIS PETERS CO., PHOTO-LITHO., WASHINGTON, D. C.

(No Model.)

H. H. HENNEGIN.
GAS ENGINE.

No. 597,771. Patented Jan. 25, 1898.

5 Sheets—Sheet 2.

Witnesses:
G. A. Pennington
F. R. Cornwall

Inventor:
H. H. Hennegin
by Paul Bakewell
his atty.

(No Model.)  
5 Sheets—Sheet 4.

H. H. HENNEGIN.
GAS ENGINE.

No. 597,771.  
Patented Jan. 25, 1898.

Witnesses:  
G. A. Pennington  
F. R. Cornwall

Inventor  
H. H. Hennegin  
by Paul Bakewell  
his atty.

THE NORRIS PETERS CO., PHOTO-LITHO., WASHINGTON, D. C.

(No Model.) 5 Sheets—Sheet 5.

H. H. HENNEGIN.
GAS ENGINE.

No. 597,771. Patented Jan. 25, 1898.

Witnesses
G. A. Pennington
J. R. Corndall

Inventor
H. H. Hennegin
by Paul Bakewell
his atty.

UNITED STATES PATENT OFFICE.

HERBERT H. HENNEGIN, OF ST. LOUIS, MISSOURI.

GAS-ENGINE.

SPECIFICATION forming part of Letters Patent No. 597,771, dated January 25, 1898.

Application filed June 16, 1896. Serial No. 595,796. (No model.)

*To all whom it may concern:*

Be it known that I, HERBERT H. HENNEGIN, a citizen of the United States, residing at the city of St. Louis, State of Missouri, have invented a certain new and useful Improvement in Gas-Engines, of which the following is a full, clear, and exact description, reference being had to the accompanying drawings, forming a part of this specification, in which—

Figure 1:
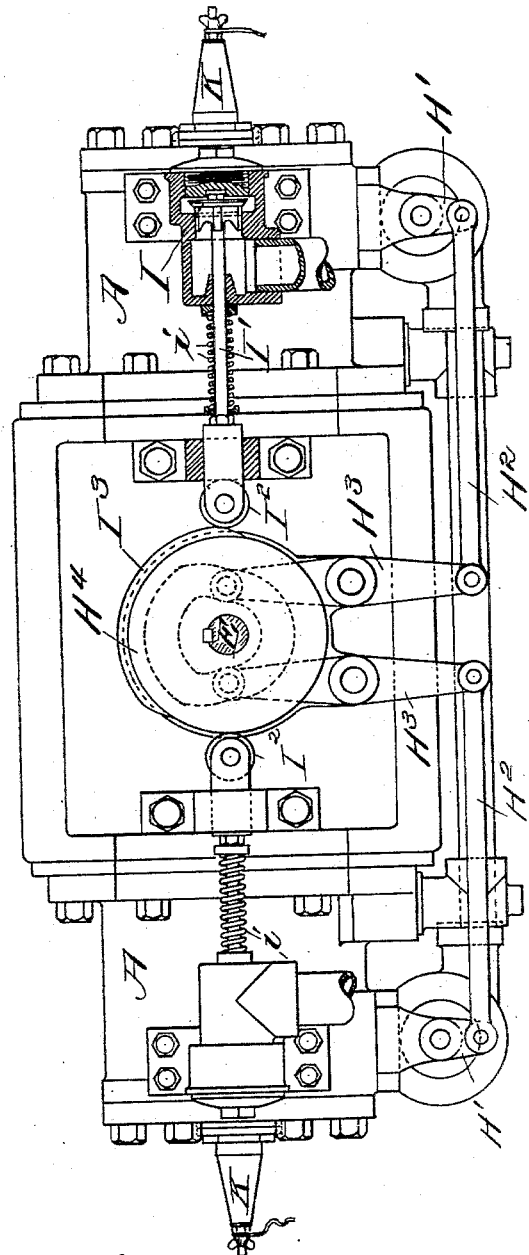
Figure 2:
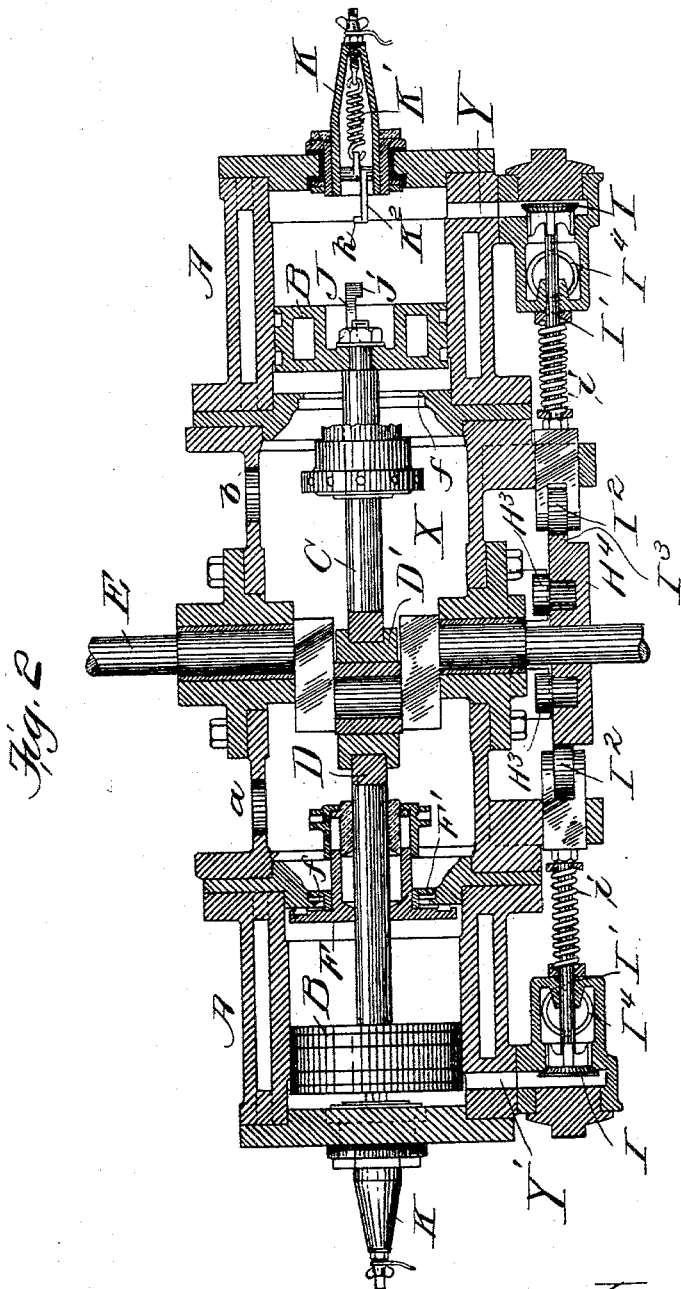
Figure 3:
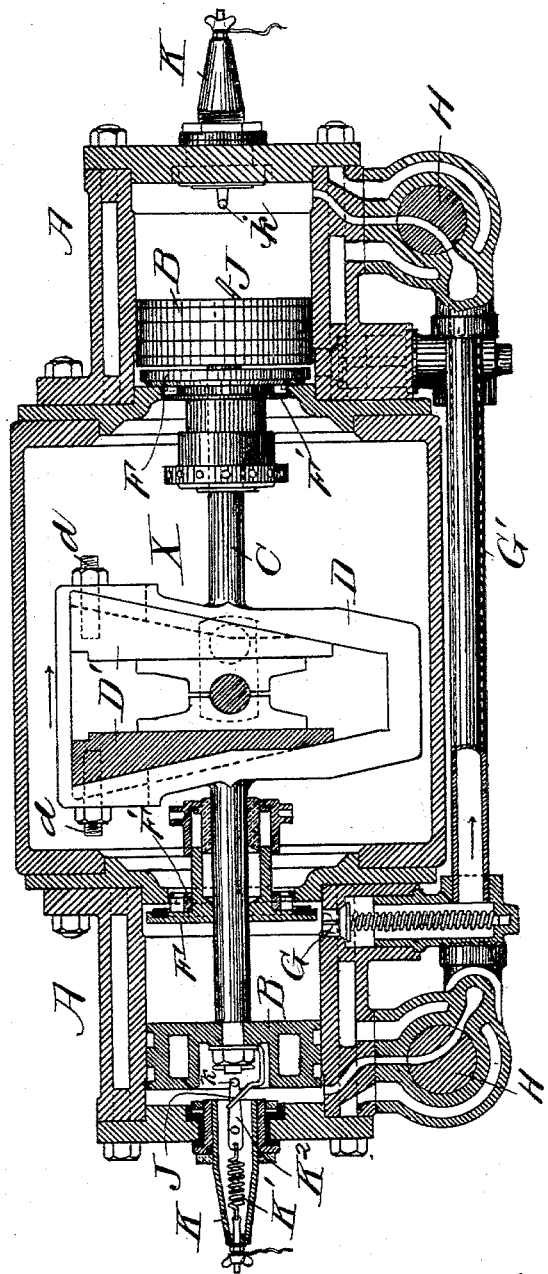
Figure 4:
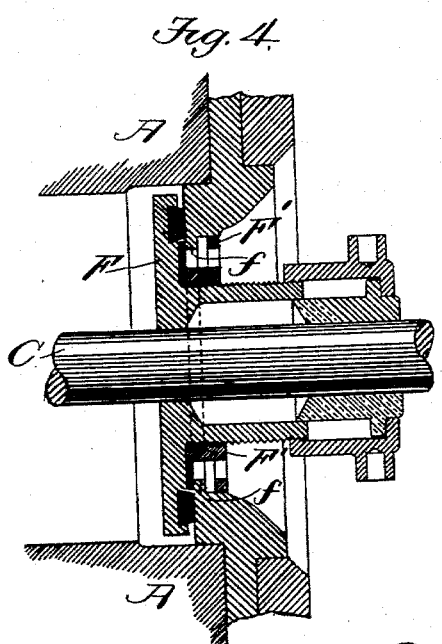
Figure 5:
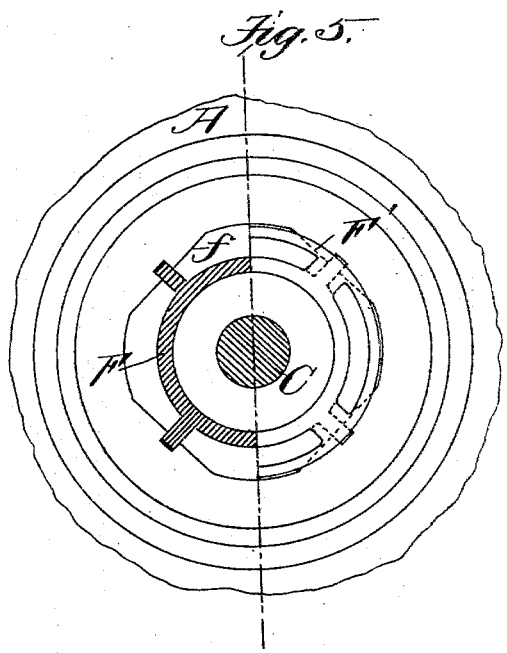
Figure 6:
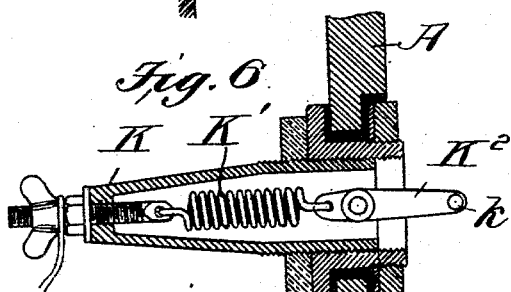
Figure 8:
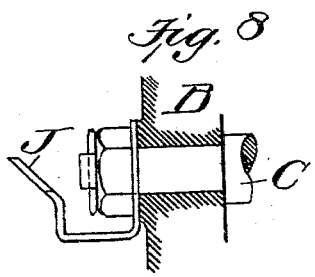
Figure 7:
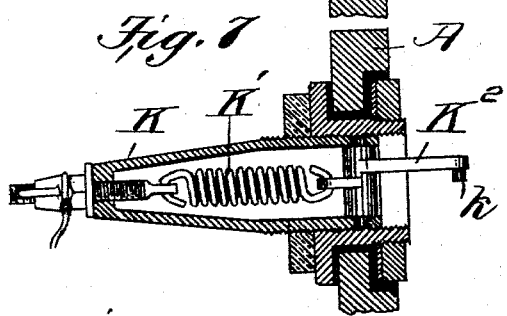
Figure 9:
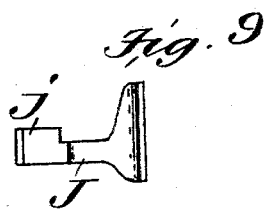
Figure 10:
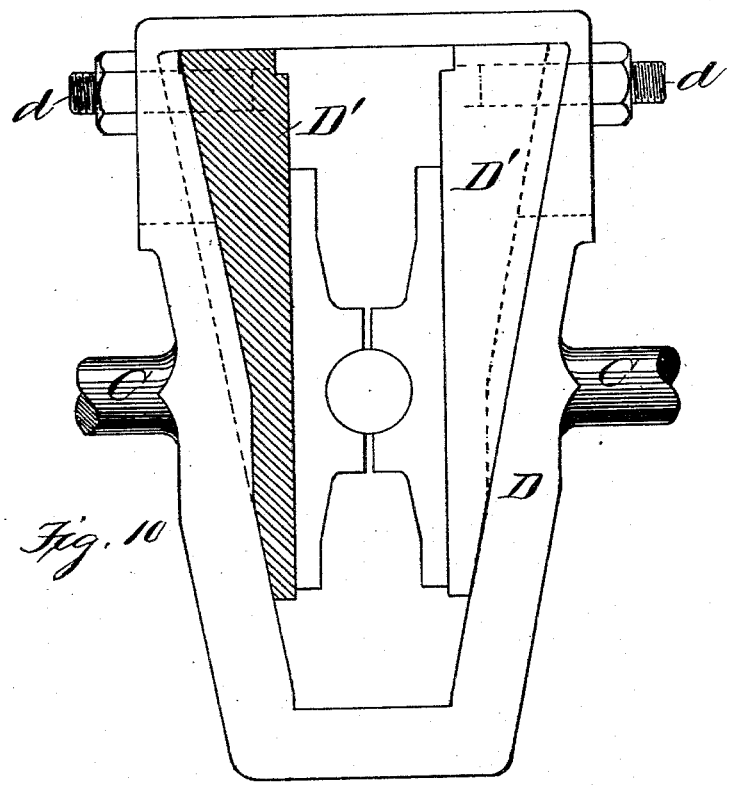
Figure 11:
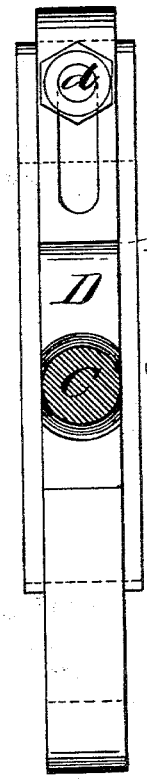
Figure 12:
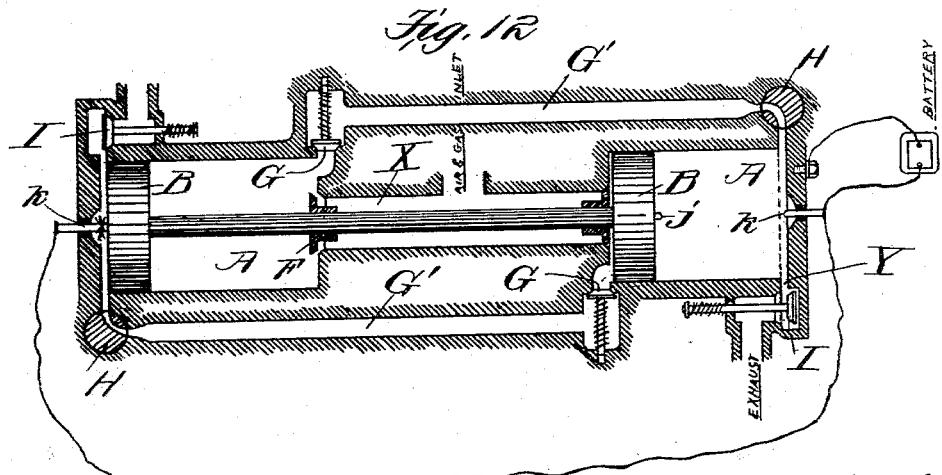

Figure 1 is a side elevational view of my improved gas-engine. Fig. 2 is a horizontal sectional view through the same. Fig. 3 is a vertical sectional view through the same. Fig. 4 is a sectional view, enlarged, of the valve in the ends of the cylinders. Fig. 5 is a detail view of the same. Fig. 6 is a vertical sectional view through the cylinder-terminal of the igniting or sparking device. Fig. 7 is a horizontal sectional view through the same. Fig. 8 is a side elevational view of the piston-terminal of the sparking device. Fig. 9 is a top plan view of the same. Fig. 10 is an enlarged view of the cross-head. Fig. 11 is an edge view of the same. Fig. 12 is a schematic view of the operation of the engine.

This invention relates to a new and useful improvement in gas-engines of that class in which two pistons are mounted on a common rod, said pistons drawing in and compressing charges of air and gas for each other. The special features of the invention in this application reside in means whereby this charge of mixed air and gas is controlled and in means for exhausting the foul air and gases after a discharge has taken place in the outer ends of the respective cylinders.

There are other features of the invention, as will hereinafter more fully appear and afterward be set forth in detail in the claims.

In the drawings, A A indicate two cylinders which are arranged in line with each other and end to end. These cylinders may be formed with chambers for the circulation of water or be jacketed, as is well understood.

B B indicate two pistons arranged to reciprocate in cylinders A A, said pistons being connected to a common rod C, which carries about its middle a cross-head D. This cross-head consists of a suitable open frame, whose inner faces at one side diverge, as shown, so as to receive wedge-shaped bearing-faces D', which are thereby made adjustable toward and from each other. These wedge-shaped bearing or guide faces are substantially U shape in cross-section and are held in their adjusted positions by bolts d, which extend through vertically-disposed slots in the frame D, as shown more clearly in Fig. 11. The cross-head proper operates vertically in these guide-pieces D', through which cross-head passes the crank-pin of shaft E. This cross-head and its associate parts preferably operate in an inclosed box or chamber which connects the two cylinders A A, and into this box or chamber leads the air and gas supply through suitable openings a and b, as shown in Fig. 2, thus making this chamber a primary mixing-chamber. I do not wish to be understood, however, as limiting myself to this particular construction, as it is obvious that the air and gas supply for the charges could be obtained in a manner different from that which I have shown and am now about to describe.

The inner ends of the cylinders A A are practically open and communicate with this chamber, which I will call X. These communications between chamber X or source of supply of the charges and the cylinders are controlled by valves F F, which operate within the cylinder and seat themselves against the inner faces of the ends of the cylinders. The construction of one of these valves is more clearly shown in the enlarged views in Figs. 4 and 5, wherein it will be seen that the valve practically carries the stuffing-box for piston-rod C. The inward movement of valve F within the cylinder is controlled by a spider-ring F', which is located on the outside of a lip or flange f, the valve F operating on the inner side of said lip, these valves being mounted on the piston-rod, and when operating—that is, in the act of opening or closing—are moved by the friction of the piston-rod passing through the boxes, which is in the same direction that the valves should operate. Although the valves might be thrown by the pressure of the fluid, as when the pistons move toward their respective valves, or the suction created by the pistons in moving away from their respective valves, such a movement is not relied upon here, as the friction of the piston-rod is positive and certain.

Assuming that a charge is being exploded at the outer face of the left-hand piston, as shown in Figs. 2, 3, and 12, and that chamber X is filled with a supply of mixed air and gas, the piston at the right hand will draw in a charge behind it, valve F opening inwardly to permit this and being limited in its inward movement by the lip $f$. At the same time the piston at the left, beginning its inward stroke, will close valve F at the left and force the charge in front of it through and beyond a spring-pressed outwardly-opening check-valve G, which controls a passage leading from the inner end of the left-hand cylinder to the outer end of the right-hand cylinder. This charge from the left-hand cylinder is not admitted directly into the right-hand cylinder, but is compressed in the pipe G', which connects the two cylinders. This pipe G' is controlled by a rotary valve H, which at this operation is turned so as to close the passage from pipe G' to the outer end of the right-hand cylinder. Rotary valve H is operated by a rock-arm H', arranged on an axial spindle extending outside of its casing, said rock-arm being operated by a link $H^2$, attached to the end of a lever $H^3$, whose other end is provided with a roller operating in a cam-slot in a disk $H^4$ on shaft E. This disk and cam-slot are so arranged that at the commencement of the movement of the pistons to the left rotary valve H is turned so as to close the exit from pipe G', and in this manner the charge in front of the left-hand piston is compressed within pipe G'. The object in thus confining the charge is to permit the foul air and gases, being the products of combustion of the exploded charge at the right-hand cylinder, to escape without mixing such foul air and gases with the non-exploded charge. The escape of this foul or exploded charge in front of the right-hand piston is accomplished by opening a port Y at the outer end of the right-hand cylinder and keeping said port open only while the right-hand piston is moving to the right. In order to do this, port Y is controlled by a valve I, which is mounted on the end of a stem I', the other end of which stem is provided with a roller $I^2$, which bears against a cam-face $I^3$ on the periphery of disk $H^4$. This stem is preferably non-circular in cross-section at one portion of its length and mounted in a suitable bracket. A spring $i$ surrounds the stem and tends to keep the roller $I^2$ in contact with its cam-face and normally seats the valve I. The foul gases escaping through port Y and beyond valve I are conducted off to any suitable point by a pipe $I^4$.

We will assume that the pistons are at or near the extreme of their right-hand stroke and it is desired to admit the unexploded charge in the outer end of the right-hand cylinder and ignite the same. The outer ends of the cylinders are provided with suitable circuit-terminals insulated from the cylinders, the other terminals being the cylinders themselves. The piston (each is provided with like igniting devices, though in this description I will refer to but one) carries on its outer face a yielding contact-tongue J, whose outer end is bent at an angle and provided with a lateral wing $j$. The cylinder-head at the outer end of the cylinder has mounted in it a hollow plug K, which contains a spring K', whose tension is to constantly keep a pivoted arm $K^2$ in a normal straight position. When the piston-head, with its contact-point, approaches this arm $K^2$, the wing $j$ will strike a lateral projection or stud $k$ on the arm $K^2$, forcing said stud to ride beneath the wing $j$ until said wing shall have passed and released the stud, as shown at the left hand in Fig. 3. Just about this time rotary valve H is operated, so as to permit the escape of the charge in pipe G' into the outer end of the right-hand cylinder. When the pistons begin their stroke to the left, the right-hand piston, whose contact-wing $j$ is on the outside of the projection $k$, will strike said projection, causing it to ride up over the wing $j$, making a sliding contact until the movement of the piston breaks said contact, causing an arc to be temporarily formed. It will be noted that the projection $k$, riding under and over the wing $j$, places the spring K' under greater tension, causing it to separate quickly from the wing $j$, which thereby prevents said parts from burning out under the presence of an arc established for some little time. By this quick separation an arc is established, but for such a short space of time that these parts will wear for a long time without being renewed.

From the above it will be noted that the igniting device forms two arcs, and it is hardly probable that both will fail. If the first explodes the charge, the expansion begins before the cross-head passes dead-center and the engine will run more evenly and with greater power, while an explosion on the second, although still very efficient, is not as much so as the first.

When the pistons begin their stroke to the left, the charge of air and gas which was drawn in behind the piston at the right-hand side beyond the valve F and from chamber X is forced through and beyond the valve corresponding to valve G and into a pipe corresponding to pipe G', as shown by dotted lines at the right in Fig. 3. At the same time a valve corresponding to valve I will open a port Y' and permit the foul air and gases to escape from in front of the left-hand piston, which left-hand piston is now sucking in the charge from chamber F behind it. The cam-disk $H^4$, with its cam-faces and groove, is so arranged and timed that the valves, which I will call I, which control the exhaust, are opened when either of the pistons are moving toward the outer ends of their respective cylinders, said valves being permitted to close, which closing is assisted by a spring, when the pistons are at or near the outer ends of their cylinders, respectively. This cam-disk also operates its train of levers corresponding to arm H', link H², and lever H³, so that the rotary valve, corresponding to valve H, will be opened to admit the confined and compressed charge in pipes corresponding to pipe G' only when the pistons have reached the outer ends of their strokes, respectively, and when the igniting devices are in position to form an arc or a double arc.

The exhaust-valves, as stated before, are spring-seated. This is for the purpose of admitting air into the outer ends of the cylinders should the igniting devices fail to work and the charge not be sufficient to fill the space. This prevents the formation of a partial vacuum.

I am aware that many minor changes in the construction, combination, and arrangement of the several parts of my engine can be made and substituted for those herein shown and described without in the least departing from the nature and principle of my invention.

Having thus described my invention, what I claim, and desire to secure by Letters Patent of the United States, is—

1. The combination with two cylinders arranged end to end, of pistons in said cylinders, said pistons being connected to a common rod, and adapted to draw in and compress charges of air and gas for each other, said charges being confined in pipes connecting the inner ends of the cylinders to the outer ends of opposite cylinders, check-valves, arranged at the inner ends of said cylinders to confine the compressed charges in said pipes, rotary valves for admitting said charges to the outer faces of the respective pistons, and means for operating said valves to open them only when the pistons are at the outer ends of their respective cylinders; substantially as described.

2. The combination with two cylinders arranged end to end, of pistons in said cylinders, said pistons being connected to a common rod and adapted to draw in and compress charges of air and gas for each other, said charges being confined in pipes connecting the inner ends of the cylinders to the outer ends of opposite cylinders, check-valves arranged in said pipes at the inner ends of said cylinders to confine the compressed charges in said pipes, valves in said pipes near the outer ends of the opposite cylinders, and means for establishing communication between said pipes and the outer ends of said cylinders when the pistons are located in the outer ends of their respective cylinders, said means being controlled by the engine-shaft; substantially as described.

3. The combination with two cylinders arranged end to end, of pistons in said cylinders, said pistons being connected to a common rod and being adapted to draw in and compress charges of air and gas for each other, pipes for receiving said charges, said pipes connecting the inner ends of the respective cylinders to the outer ends of opposite cylinders, suitable valves in said pipes for confining said charges, and means for operating the valves located near the outer ends of the cylinders so that the charges are admitted to the outer ends of the cylinders at the proper time relative to the position of the pistons, said means consisting of a cam-disk mounted to revolve with the engine-shaft, and suitable mechanism operated by said disk and connected to the valves; substantially as described.

4. The combination with two cylinders in line with each other, pistons in said cylinders, which are connected to a common rod, pipes for receiving charges from the inner ends of the cylinders, check-valves at the inner ends of the pipes, said pipes leading to the outer ends of opposite cylinders, rotary valves located in the outer ends of said pipes, rock arms and levers for operating said valves, valves for controlling the exhaust at the outer ends of the cylinders and a cam-disk for operating said rotary and exhaust valves at the proper time; substantially as described.

5. The combination with two cylinders arranged in line with each other, the inner ends of said cylinders being open and communicating with a chamber arranged therebetween, inwardly-extending flanges $f$ at said open ends of the cylinders, valves F within the cylinders, and spider-rings F' arranged upon the valves and extending outside the flanges $f$; substantially as described.

6. The combination with two cylinders arranged in line with each other, the inner ends of said cylinders being open and communicating with a chamber arranged therebetween, inwardly-extending flanges $f$ at said open ends of the cylinders, valves F within the cylinders, spider-rings F' arranged upon the valves and extending outside the flanges $f$, stuffing-boxes extending inwardly from the valves F, and pistons in said cylinders which are connected by a common rod, upon which rod the valve stuffing-boxes are mounted; substantially as described.

7. The combination with two cylinders in line with each other, of an air and gas chamber between said cylinders, pistons in said cylinders, said pistons being connected by a common rod, valves for controlling communication between the inner ends of the cylinders and said chamber, said pistons being adapted to draw in from said chamber suitable charges for each other, pipes for receiving said charges when they are forced out of the cylinders, said pipes being connected with the outer ends of the opposite cylinders, valves for retaining the compressed charges in said pipes until the pistons are at the outer ends of their respective cylinders, and means for establishing communication between said pipe and the outer ends of the cylinders automatically; substantially as described.

8. The combination with two cylinders whose inner end open into a supply-chamber containing air and gas, check-valves which control the communication between the inner ends of said cylinders and said chamber, pipes for connecting the inner ends of the cylinders with the outer ends of their opposite cylinders, respectively, valves in said pipes, one of which is automatically opened to admit a charge of air and gas to the outer faces of the pistons only when said pistons are at or near the outer ends of their cylinders, and means for opening the exhaust at the outer ends of the cylinders only when the pistons are moving toward the outer ends of their cylinders, said exhaust being closed when the pistons are moving toward the inner ends of their respective cylinders; substantially as described.

In testimony whereof I hereunto affix my signature, in presence of two witnesses, this 5th day of June, 1896.

HERBERT H. HENNEGIN.

Witnesses:
HUGH K. WAGNER,
G. A. PENNINGTON.